Sept. 3, 1929.  T. SCHULLSTRÖM  1,726,721

REGULATION

Filed April 24, 1926

INVENTOR.
Tage Schullström
BY
Wm T Nedlund
his ATTORNEY

Patented Sept. 3, 1929.

1,726,721

UNITED STATES PATENT OFFICE.

TAGE SCHULLSTRÖM, OF NEW YORK, N. Y.

REGULATION.

Application filed April 24, 1926. Serial No. 104,293.

My invention relates to automatic regulation and more particularly to the transmission of regulating impulses from the controlling force to that member of the regulating organization which is first affected by the impulses. One object of my invention is to provide a novel arrangement wherein an adjustment for regulation by different pressures is obtained without rearranging the relative arrangement of parts of the regulating apparatus and without the removal and replacement of parts while providing an arrangement which is compact and easy to manipulate. A further object of my invention is to provide a novel, remote control by means of which it is possible to adjust a regulator at a distance from the regulating unit.

On the accompanying drawing I have shown two modifications of the invention applied to different forms of regulators, in both of which modifications the primary regulating impulses are taken from a steam line and utilized to govern flow through the same steam line but it is to be understood that the invention is not limited to control of steam nor to control by the same medium which is controlled nor to control by and of pressure.

My invention has a broad field of applicability and may be used anywhere where there is a transmission of regulating impulses.

Figure 1:
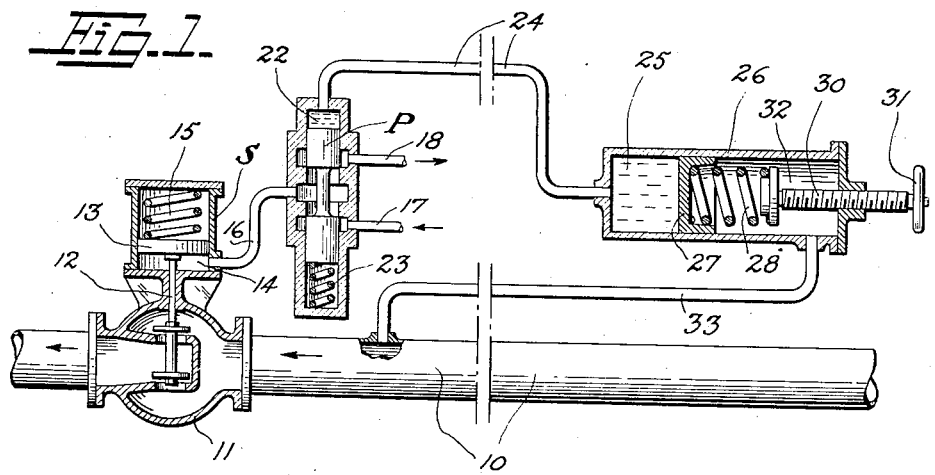
Figure 2:
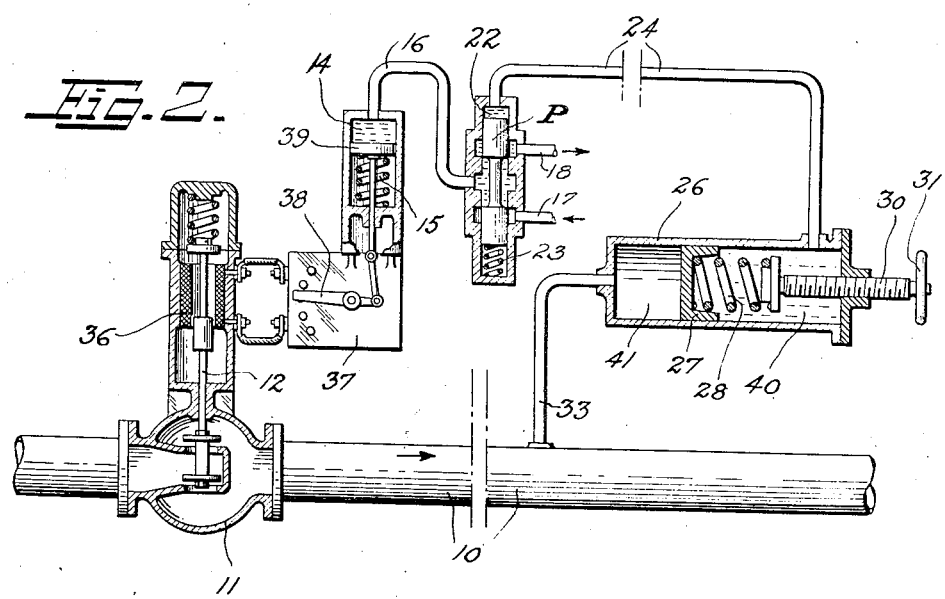

On the accompanying drawing; Fig. 1 shows the invention applied in the transmission of steam pressure to a fluid pressure operated valve; and Fig. 2 shows a modified arrangement used for controlling an electrically operated valve.

Referring more particularly to Fig. 1, 10 designates a steam conduit, flow of steam through which is controlled by a main regulating valve 11. Spindle 12 which actuates valve 11 is connected to a piston 13 forming part of a servo-motor S. Piston 13 is acted upon, on the lower side, by the pressure of a fluid such as oil in space 14, and on the upper side by a spring 15. Conduit 16 conducts liquid to and from the servo-motor. Flow through conduit 16 is controlled by a pilot valve P which is moved to afford communication between either a supply conduit 17 and conduit 16 or a waste conduit 18 and conduit 16. Oil is supplied to conduit 17 from any desired source.

Pilot valve P is moved by changes of pressure in space 22. Pressure acting in space 22 is opposed by a spring 23.

A tubing 24 connects chamber 22 with a chamber 25 in an adjustment housing 26. One side of chamber 25 is formed by a piston 27. A spring 28 acts on one side of piston 27 and is arranged to cooperate with a set screw 30 having an operating handle 31 by means of which it may be adjusted and by means of which the tension of spring 28 may be changed. On the opposite side of piston 27 from chamber 25 is a chamber 32. Chamber 32 is connected to conduit 10 by means of tubing 33. Piston 27 divides adjustment housing 26 into two compartments made variable in size by movement of piston 27. Spaces 25 and 22 and tubing 24 may be filled with any fluid but preferably with a liquid. The nature of the fluid will, in part, depend on the degree of sensitivity of regulation desired.

The operation is as follows:

Assume that the pressure in conduit 10, on that side of valve 11 to which tubing 33 is connected, rises. The rise of pressure in conduit 10 causes a rise of pressure in chamber 32. This causes a movement of piston 27 to the left, as shown. The fluid in tubing 24 and chambers 22 and 25 acts to transmit motion of piston 27 to pilot valve P, causing a downward movement of pilot valve P and thus effecting communication between supply conduit 17 and space 14 through conduit 16. Oil thus enters space 14 and increases the pressure therein, as a result of which piston 13 is moved upwardly and valve 11 opens more or less. The flow in conduit 10 being to the left, as indicated, an increase of opening of valve 11 reduces the pressure in conduit 10 adjacent its connection with tubing 33, thus restoring the pressure to that value which it had before the rise of pressure took place. It will be seen from the above description that valve 11 operates to maintain a constant pressure in conduit 10 on the inflow side of the valve. Valve 11 is thus what is known as an over-flow valve.

Spring 28 and piston 27 and associated parts serve to cause a pressure gradient in the line of impulse transmission between conduit 10 and space 22. This pressure gradient can be altered by turning set screw 30. Assume, with a given position of set screw 30, that valve 11 operates to maintain a constant pressure of 150 lbs., per square inch, ahead of the same in conduit 10. The pressure in spaces 25 and 22 and in tubing 24 will be greater than 150 lbs., per square inch, by an amount equivalent to the force of spring 28. Consequently spring 23 is stressed to a greater amount than 150 lbs., per square inch. Now assume that handle 31 is so turned that piston 27 moves to the left, as shown. This causes a downward movement of pilot valve P by transmission of force through the fluid in spaces 22 and 25 and tubing 24. This action is the same as though there had been a rise of pressure in conduit 10 ahead of valve 11 without any adjustment of handle 31. Downward movement of pilot valve P causes an opening of valve 11. This decreases the pressure ahead of valve 11 whereby pressure is decreased in tubing 33 and in chamber 32 and the pressure in these last mentioned parts will decrease until pilot valve P and consequently piston 27 have returned to what may be termed a neutral position at which there is no flow through conduit 16. The regulating organization will thus operate to maintain a pressure in conduit 10 ahead of valve 11 which is constant but lower than 150 lbs. per square inch. By adjustment of handle 31 any desired pressure may be obtained.

It will be obvious from the above description that, if it is desired to operate valve 11 at a controlling value higher than the assumed 150 lbs., per square inch, the operation is reversed; that is, handle 31 is turned so that piston 27 moves to the right, as shown. This causes an upward movement of pilot valve P and connection between conduits 16 and 18 whereby pressure is released in space 14 and valve 11 is closed more or less, thus raising the pressure in tubing 33 and returning piston 27 to that position which causes valve P to cut off communication between conduits 16 and 18. The regulation organization will then operate at a value which may be, for example, 165 lbs., per square inch.

It is to be noticed that the change of regulation in no way affects pilot valve P or servo-motor S and that tubing 24 and 33 can be extended so that adjustment housing 26 may be placed anywhere which is convenient for the control. It will be evident that this control can be applied to any type of regulator without affecting the regulator itself. Obviously, this type of remote control can be applied to the valve shown in copending application Serial No. 102,636.

In Fig. 2 is shown an electrically operated valve wherein a solenoid 36 is used to control valve 11. Movement of valve spindle 12 is effected in known manner, by altering the electrical conditions in the solenoid by means of an apparatus such as rheostat 37. Arm 38 of rheostat 37 is operated by means of a piston 39 which is acted upon, on one side, by fluid pressure in chamber 14 and, on the other side, by a spring 15. Chamber 14 is connected, by means of a conduit 16, with a pilot valve P, such as shown in Fig. 1. Chamber 22 at one end of pilot valve P is connected with chamber 40 in adjustment housing 26. Within adjustment housing 26 is a piston 27 acted upon, on one side, by a spring 28, the tension of which may be adjusted by means of set screw 30 and handle 31 as in the previous modification.

Tubing 33 connects conduit 10 with chamber 41 in adjustment housing 26 which is on that side of piston 27 which is opposite to spring 28.

The operation of this modification is as follows:

Assume that the regulator organization is arranged to act as a reducing valve, the flow being in the direction indicated by the arrow, to maintain a constant pressure behind the valve in conduit 10. Assume that a given tension of spring 28 gives a certain constant pressure in conduit 10. Now assume that the tension of spring 28 is so altered that piston 27 is moved to the left, as shown. This causes an upward movement of pilot valve P and a communication between chamber 14 and outlet conduit 18 whereby piston 39 moves upwardly rotating arm 38 and changing the solenoid current. This causes an opening of valve 11 whereby pressure increases behind the same and in chamber 41 thus returning piston 27 to neutral position. Regulation will now take place at a higher value of pressure than previously.

The reverse operation whereby adjustment of handle 31 causes the regulator to operate at a lower value of pressure will be readily understood from the above description.

While I have described the preferred embodiments of my invention it is to be understood that the same is not limited to the precise embodiments shown but may be varied within the spirit and scope of the invention as determined by the appending claims taken in connection with the state of the art.

Having thus described my invention what I claim is:

1. Adjusting apparatus comprising a source of pressure impulses subject to pressure variation, and means for controlling said pressure variation including a member for receiving pressure impulses, tubing for transmitting pressure impulses from said source to said receiving member, and a resilient member arranged to cause a pressure gradient in said tubing between said source of pressure impulse and said pressure impulse receiving member.

2. Adjusting apparatus comprising a source of pressure impulses subject to pressure variation, and means for controlling said pressure variation including a member for receiving pressure impulses, tubing for transmitting pressure impulses from said source to said receiving member, and means including a spring to cause a pressure gradient in said tubing between said source of pressure impulse and said pressure impulse receiving member.

3. Adjusting apparatus comprising a source of pressure impulses subject to pressure variation, and means for controlling said pressure variation including a member for receiving pressure impulses, tubing for transmitting pressure impulses from said source to said receiving member, resilient means to cause a pressure gradient in said tubing between said source of pressure impulse and said pressure impulse receiving member and means to adjust said resilient means to alter the pressure gradient.

4. Adjusting apparatus for regulators, comprising a source of pressure impulses subject to pressure variation, means controlling said pressure variation including a member for receiving pressure impulses, an adjustment housing, a movable member within said housing dividing the same into two compartments, tubing connecting one compartment with said pressure impulse source and the other compartment with said impulse receiving member, and means to apply an added force on one side of said movable member.

5. Adjusting apparatus for regulators comprising a source of pressure impulses subject to pressure variation, means controlling said pressure variation including a member for receiving pressure impulses, an adjustment housing, a movable member within said housing dividing the same into two compartments, tubing connecting one compartment with said pressure impulse source and the other compartment with said impulse receiving member, means to apply an added force on one side of said movable member and a device for adjusting the last mentioned means.

6. Regulating apparatus comprising a conduit, a main control member in said conduit, a primary regulating member for controlling said main control member, a pressure chamber adjacent said primary regulating member, impulse transmitting tubing connecting said conduit with said chamber, an adjustment housing interposed in said tubing, a resilient member within said housing for causing a pressure gradient therein and a device for altering the force of said resilient member.

7. Regulating apparatus comprising a primary regulating member, a chamber in said primary regulating member, a conduit in which pressure variations occur and tubing for transmitting changes of pressure from said conduit to said chamber, an adjustment housing interposed in said tubing and containing mechanism including a spring for causing a pressure gradient in the tubing so that different values of absolute pressure may occur in said chamber and in said conduit, the arrangement being such that variations of pressure in said conduit cause variations of pressure in said chamber of like amplitude but at different average values of pressure, and means to adjust the tension of said spring.

8. Regulating apparatus comprising a course of pressure impulses subject to pressure variation, a regulating member controlling said pressure variation, an adjusting device adapted to be positioned remotely from either said source or said regulating member and independently thereof, spring means to cause and adjust a pressure gradient within said adjusting device, tubing connecting said source of impulse with said adjusting device, and tubing connecting said adjusting device with said regulating member.

9. Regulating apparatus comprising a source of pressure impulses subject to pressure variation, a regulating member controlling said pressure variation, an adjusting device adapted to be positioned remotely from said source of impulse and said regulating member and independently thereof, spring means to cause and to adjust a pressure gradient within said adjusting device, an extended portion of tubing connecting said source of impulse with said adjusting device, and an extended portion of tubing connecting said adjusting device and said regulating member.

10. In combination, a conduit for containing fluid under pressure, an overflow valve for maintaining said fluid at a desired pressure, means responsive to variation of fluid pressure controlling said overflow valve, means transmitting pressure from said conduit to said control means, and resilient means for inserting a pressure gradient in said transmitting means between said conduit and said control means.

11. In combination, a conduit for containing fluid under pressure, an overflow valve for maintaining said fluid at a desired pressure, means responsive to variation of fluid pressure controlling said overflow valve, tubing transmitting pressure from said conduit to said control means, and adjustable resilient means establishing a pressure gradient between different parts of said tubing extending from said conduit to said control means.

In testimony whereof I hereunto affix my signature.

TAGE SCHULLSTRÖM.